United States Patent
Floß et al.

(10) Patent No.: US 11,323,010 B2
(45) Date of Patent: May 3, 2022

(54) ELECTRIC MACHINE

(71) Applicant: AUDI AG, Ingolstadt (DE)

(72) Inventors: Martin Floß, Ingolstadt (DE); Peter Maischak, Hepberg (DE); Michael Schwarzer, Munich (DE); Albert Scharlach, Oberdolling (DE); Philipp Uhlmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 21 days.

(21) Appl. No.: 16/927,087

(22) Filed: Jul. 13, 2020

(65) Prior Publication Data
US 2021/0036582 A1 Feb. 4, 2021

(30) Foreign Application Priority Data
Aug. 1, 2019 (DE) .......................... 102019120802.5

(51) Int. Cl.
*H02K 9/28* (2006.01)
*H02K 13/00* (2006.01)

(52) U.S. Cl.
CPC ............. *H02K 9/28* (2013.01); *H02K 13/003* (2013.01)

(58) Field of Classification Search
CPC ................................ H02K 9/28; H02K 13/003
USPC ............................................................ 310/52
See application file for complete search history.

(56) References Cited

U.S. PATENT DOCUMENTS

| | | | | |
|---|---|---|---|---|
| 3,784,855 A | * | 1/1974 | Motegi | H02K 9/28 310/227 |
| 4,334,159 A | * | 6/1982 | Ooki | H02K 9/28 310/227 |
| 2014/0038433 A1 | * | 2/2014 | Rehder | H02K 9/28 439/18 |
| 2015/0288256 A1 | * | 10/2015 | Tominaga | B60L 3/0061 310/227 |
| 2016/0164236 A1 | | 6/2016 | Nakayama et al. | |
| 2019/0044402 A1 | * | 2/2019 | Weber | H02K 17/165 |

FOREIGN PATENT DOCUMENTS

| | | | |
|---|---|---|---|
| DE | 1924861 | * | 10/1965 |
| DE | 1924861 U | | 10/1965 |
| DE | 3020472 A1 | | 12/1980 |
| DE | 235759 | * | 5/1986 |
| DE | 235759 A1 | | 5/1986 |
| DE | 4210974 A1 | | 10/1993 |

OTHER PUBLICATIONS

Examination Report dated Apr. 2, 2020 in corresponding German application No. 102019120802.5; 10 pages.

* cited by examiner

*Primary Examiner* — Ahmed Elnakib
(74) *Attorney, Agent, or Firm* — Maier & Maier, PLLC

(57) ABSTRACT

An electric machine, including a stator and a rotor shaft having a cooling device, which shaft carries at least one slip ring, which has a lateral surface, which electrically contacts a contact element fixed on the stator, and which is at least partially accommodated in a recess of the rotor shaft, wherein an extension section of the slip ring, which is at least partially accommodated in the recess, extends beyond the lateral surface in one or both axial directions of the rotor shaft.

20 Claims, 2 Drawing Sheets

ELECTRIC MACHINE

FIELD

The disclosure relates to an electric machine, including a stator and a rotor shaft having a cooling device, which shaft carries at least one slip ring, which has a lateral surface, which electrically contacts a contact element fixed to the stator, and which is at least partially accommodated in a recess in the rotor shaft.

BACKGROUND

Slip rings are used in electric machines, for example, generators or drive motors in motor vehicles, jointly with a brush to transmit electrical power between rotor and stator. For example, they can be used in externally-excited synchronous machines to supply a rotor-side winding with current, wherein a carbon brush fixed on the housing slides on the slip ring fastened on the rotating element and thus ensures an electrical sliding contact. Heat arises due to mechanical friction and electrical losses, which has to be dissipated.

Typically, slip rings are made from materials having good electrical conductivity, such as brass, bronze, stainless steel, or precious metals, which typically also have good thermal conductivity, as a result of which an almost constant temperature forms within the slip ring. In contrast, slip ring carriers, in which the slip rings are mounted, consist of an electrically and usually also thermally insulating material. As a result, heat dissipation from the slip ring via a cooled rotor shaft is usually severely limited.

DE 42 10974 A1 describes a cooling device for slip rings of a resistance welding machine arranged in the region of a roller bearing. The coolant is guided through the axis of the welding electrodes and through the axis of a roller bearing here. Nevertheless, the heat is not optimally dissipated even in this design.

DE 30 20472 A1 describes a slip ring fixedly mounted on a rotor shaft, which comes into electrical sliding contact with multiple brushes. A component arranged between the slip ring and the brush is cooled by a cooling gas here. In addition, the slip ring also has interconnected, liquid-filled cooling channels oriented perpendicularly with respect to the brush elements, which ensure uniform cooling over the entire area of the slip ring. However, it is complex to conduct the coolant directly through the slip ring.

SUMMARY

The disclosure is therefore based on the object of specifying a device with which a large amount of heat can be dissipated from the slip rings and which has a simple and robust construction.

This object is achieved according to the invention in that, in the case of an electrical machine of the type mentioned at the outset, an extension section of the slip ring, which is at least partially accommodated in the recess, extends beyond the lateral surface in one or both axial directions of the rotor shaft.

As explained at the outset, when the rotor shaft is cooled, the heat dissipation from a slip ring is limited by a slip ring carrier which lies between the cooled region of the rotor shaft and the slip ring and typically consists of an electrically and thermally insulating material. The heat flow through the slip ring carrier or the rotor shaft is proportional to the product of the thermal conductivity of the material used and the area participating in the heat transport perpendicular to the heat transport direction. This area that can be used for heat dissipation is enlarged by the extension section and the heat flow between slip ring and cooling is hereby increased.

The electric machine can form a generator or motor, in particular a drive motor for a motor vehicle. In the case of internal rotors, the rotor is arranged inside and in the case of external rotors outside the stator.

As part of the rotor, the rotor shaft can carry a laminated core and windings, wherein the latter is energized via contact elements fixed on the stator, for example, carbon brushes, which are in electrical contact with a respective slip ring fastened on the rotor shaft. The frictional heat arising at the contact surface between contact element and slip ring is dissipated by a cooling device arranged inside the rotor shaft.

In the case of internal rotors, the at least one slip ring can be arranged on the outer lateral surface of the rotor shaft and in the case of external rotors, it can be arranged on the inner lateral surface of the rotor shaft, wherein a rotor can have one or also multiple slip rings. The slip rings can be accommodated here in a slip ring carrier at the axial end of the rotor shaft in recesses provided for slip rings. The slip ring carrier is part of the rotor shaft and typically consists of an electrically insulating and mechanically stable material, which, however, has a low thermal conductivity. The extension section of the slip ring, which is oriented radially towards the rotor shaft and is at least partially accommodated in the recess, can have a larger area perpendicular to the radial direction than the section opposite it, which is in contact with the carbon brush. In the case of internal rotors, the extension section can be located in the region of the inner surface of the slip ring and in the case of external rotors in the region of the outer surface of the slip ring.

The part of the slip ring opposite to the extension section, which forms the outer lateral surface in the case of internal rotors and forms the inner lateral surface of the slip ring in the case of external rotors, is in electrical sliding contact with the contact element, wherein the contact element can be, for example, a carbon brush which transmits the electric current to the rotor shaft.

According to the present invention, the extension section of the slip ring can be rectangular in cross section. The extension section which is completely or at least partially accommodated in the recess of the rotor shaft can extend axially on one or two sides beyond the lateral surface which is in electrical contact with the contact element. In cross section, the extension section can thus be shaped such that it projects on one or on both sides in the form of an extension with a rectangular cross section beyond the lateral surface that is in electrical contact with the contact element. In comparison to conventional slip rings, the area of the slip ring opposite to the outer surface is thereby larger, whereby the heat dissipation is improved.

The slip ring can have an L-shaped or T-shaped cross section. If the extension section extends in exactly one axial direction beyond the opposite lateral surface, the cross section can be L-shaped. If, on the other hand, the extension section extends beyond the opposite section on both sides and if the thickness of the extension section is equal on both sides, in particular in the radial direction, this is a T-shaped cross section.

The slip ring can alternatively have a trapezoidal cross section, wherein the shorter of the parallel sides of the trapezoid forms the lateral surface of the slip ring. The shorter parallel side of the trapezoid is in electrical sliding contact here with a contact element, such as a carbon brush.

The heat arising due to mechanical friction and electrical loss can be dissipated primarily via the longer parallel side of the trapezoid forming the extension section. The longer parallel side of the trapezoid results, in comparison to conventional slip rings, in a larger surface area on the area of the slip ring facing away from the contact element, whereby a larger amount of heat can be dissipated.

The slip ring can extend beyond the lateral surface exclusively inside the recess. The extension section of the slip ring can thus be completely accommodated in the recess of the rotor shaft or of the slip ring carrier provided for this purpose. This results in a higher stability of the device and a smaller distance between the extension section of the slip rings and the cooling device, whereby the heat dissipation becomes more efficient.

In the electric machine according to the invention, the cooling device can comprise at least one coolant-conducting region located within the rotor shaft, wherein the contact element is separated from the coolant-conducting region at least by a wall of the recess. In particular, this means that there is never a direct contact between the contact element and the coolant or between the slip ring and the coolant. In the case of internal rotors, the coolant can be let into a rotor shaft designed as a hollow shaft, for example, by a cooling device located inside the rotor shaft, such as lance cooling, and can be discharged again along the outer housing of the rotor shaft, which adjoins the slip ring carrier. Furthermore, the cooling device can also be in the form of a heat pipe or a thermosiphon cooling, for example. In the case of internal rotors, cooling structures lying radially inside the slip ring do not require a complex structure of the slip ring, while efficient cooling is nevertheless possible due to the geometry of the slip ring according to the invention.

The coolant-conducting region can be guided axially through the slip ring. In the case of internal rotors, the slip ring can have a central opening or bore through which the coolant-conducting region of the rotor shaft is guided. A particularly efficient cooling is possible due to a short distance between the slip ring and the cooling device and due to the geometry of the slip ring according to the invention.

The electrical machine can have two axially spaced-apart slip rings arranged on the rotor shaft, wherein the extension section extends on at least one side in the axial direction beyond the lateral surface in each of the slip rings, and wherein the slip rings are arranged such that the sides on which the extension section respectively extends farther beyond the lateral surface face away from one another. The slip rings can be arranged in axially spaced-apart recesses of the slip ring carrier provided for this purpose.

If the respective slip ring extends in exactly one axial direction beyond the lateral surface, the sides on which the slip ring extends beyond the lateral surface can face away from one another. If the respective slip ring extends in both axial directions beyond the lateral surface, the slip rings can be arranged such that the sides on which the slip ring extends farther beyond the lateral surface face away from one another. As a result, the distance between the slip rings is sufficiently large to electrically insulate the slip rings from one another and to ensure optimal heat dissipation without requiring additional installation space.

BRIEF DESCRIPTION OF THE DRAWINGS

The disclosure will be explained hereinafter on the basis of exemplary embodiments with reference to the drawings. The drawings are schematic representations and in the figures.

DETAILED DESCRIPTION

Figure 1:
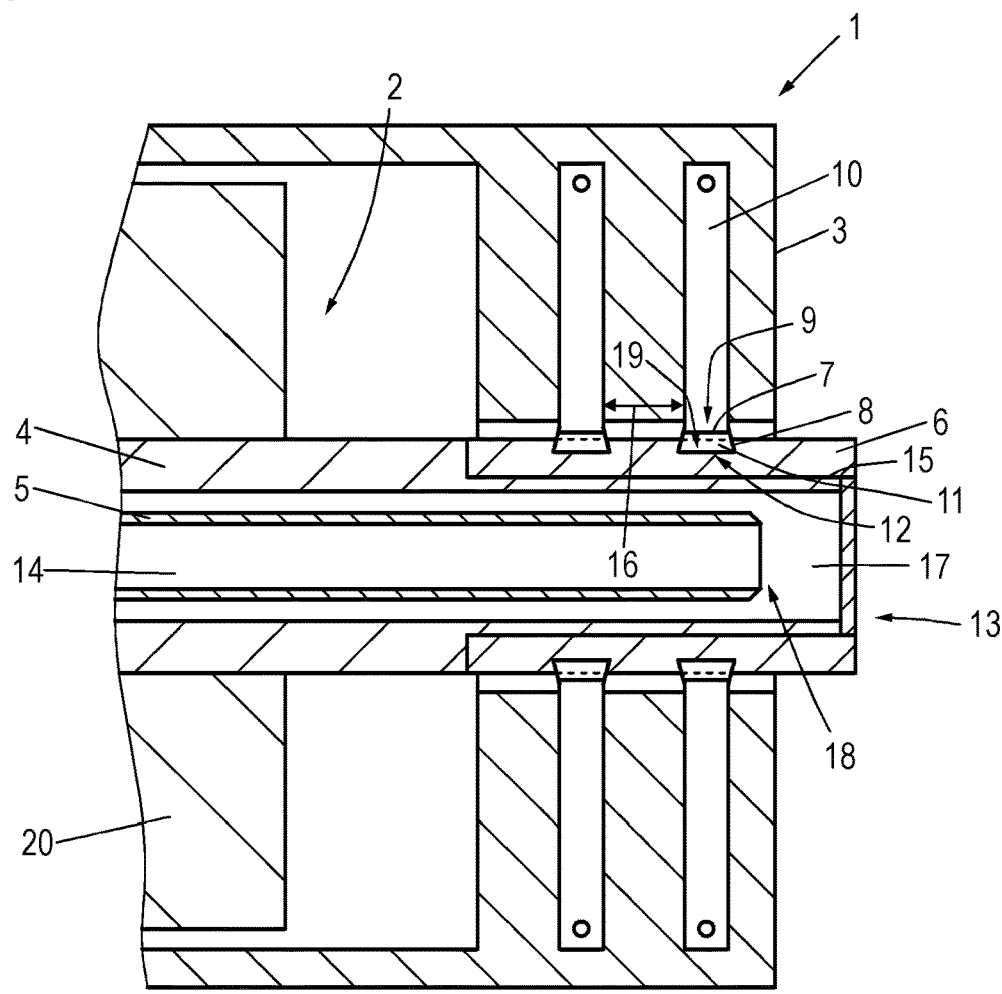
FIG. 1 shows an exemplary embodiment of an electric machine according to the invention.

FIG. 1 shows an electric machine 1, for example, an externally-excited synchronous machine, in which windings (not shown) arranged on a laminated core 20 supported by a rotor shaft 4 are energized via stator-side fixed contact elements 10 and slip rings 7 mounted on the rotor shaft 4. Each contact element 10 is in electrical sliding contact with one of the slip rings 7 here. In order to make the arrangement more stable and to electrically insulate the slip rings 7 from one another, the slip rings 7 are arranged in recesses 8 of a slip ring carrier 6 integrated into the rotor shaft 4. The slip ring carrier 6 is typically produced from an electrically and thermally insulating material, which makes it difficult to dissipate heat that is arises due to mechanical friction between the contact element 10 and the slip ring 7.

The electric machine 1 is an internal rotor, in which an internal rotor 2, consisting of the rotor shaft 4, the laminated core 20 with the windings arranged thereon, and the slip rings 7, is surrounded by an external stator 3. For reasons of clarity, possible further components of the rotor or stator 3 are not shown. On the inside of the cylindrical rotor shaft 4, a likewise cylindrical lance cooling 5 is arranged as a cooling device 18 such that the outer casing of the lance cooling 5 and the inner casing of the rotor shaft 4 do not touch at any point, at least in the region shown.

At the axial end 13, the rotor shaft 4 is formed on the outer casing as a slip ring carrier 6, which has on its outer jacket axially spaced-apart recesses 8 accommodating slip rings 7. The slip ring carrier 6 is typically produced from an electrically and also thermally insulating material, while the slip rings 7 are produced from an electrical and also a thermal conductor, such as brass, bronze, stainless steel, or precious metals.

On its outer lateral surface 9, the slip ring 7 is in electrical sliding contact with a contact element 10 fastened on the stator 3, such as a carbon brush. An electrical contact, by which electric power or signals can be transmitted between the rotor 2 and the stator 3, is thus ensured between the rotor 2 or elements arranged on the rotor 2, for example, the windings, and the stator 3. Since the slip ring 7 and the contact element 10 are in sliding contact with one another, during a rotation of the rotor 2, heat arises due to mechanical friction and electrical losses, which is nearly uniformly distributed inside the slip ring 7 due to its good thermal conductivity and is primarily dissipated via the slip ring carrier 6, the rotor shaft 4, and the lance cooling 5.

The extension section 11 lying opposite to the outer lateral surface 9 of the slip ring 7 forms the inner surface 12 of the slip ring 7 and in the present example extends in both axial directions of the rotor shaft 4 beyond the outer lateral surface 9 of the slip ring 7.

The slip ring 7 shown in FIG. 1 has a trapezoidal cross section, wherein the shorter of the parallel sides of the trapezoid forms the outer lateral surface 9 of the slip ring 7 and the longer of the parallel sides of the trapezoid forms the inner surface 12 of the slip ring 7 and is part of the extension section 11. Because the inner surface 12 of the slip ring 7 has a larger surface than the outer lateral surface 9 due to the extension section 11, the heat dissipation is more efficient than that of conventional slip rings.

The extension section 11 of the slip ring 7 is located at least partially within the recess 8, as a result of which the distance between the inner surface 12 of the slip ring 7 and the coolant-conducting region 17 is small and the heat dissipation becomes even more efficient. The accommodation of the extension section 11 of the slip ring 7 in the recesses 8 of the slip ring carrier 6 provided for this purpose moreover results in a more stable device.

The lance cooling 5 arranged within the rotor shaft 4 extends into the region of the axial end 13 of the rotor shaft 4. Via this lance cooling 5, the coolant 14 is let into the coolant-conducting region 17 of the rotor shaft 4, which is separated from the slip ring 7 at least by the wall 19 of the recess 8. At the axial end 13 of the rotor shaft 4, the coolant 14 is let in through an opening in the lance cooling 5 into the coolant-conducting region 17 and is then discharged again along the outer housing 15 of the rotor shaft 4. In order to ensure that the slip ring 7 is cooled as efficiently as possible, the coolant-conducting region 17 is guided axially through the slip rings 7 arranged at the axial end 13 of the rotor shaft 4. The coolant 14 can be a water-based mixture, a cooling oil, or a gaseous coolant. Instead of lance cooling, for example, a heat pipe or a thermosiphon cooling can also be used as the cooling device.

Figure 2:
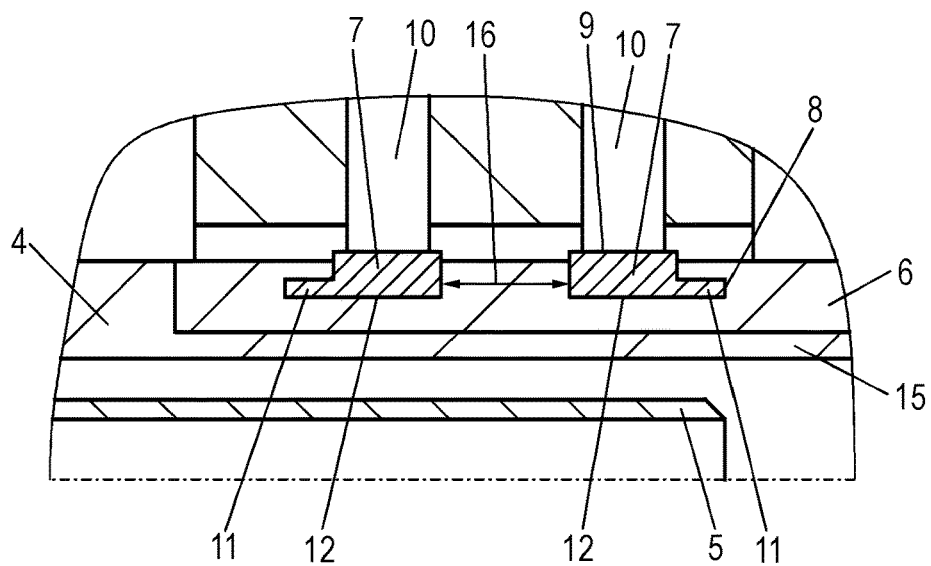
FIG. 2 shows a detail view of a further exemplary embodiment of the electric machine according to the invention.

FIG. 2 shows a detail view of a further exemplary embodiment of the electric machine 1 according to the invention, wherein the slip ring carrier 6 formed as part of the rotor shaft 4 has two slip rings 7 in the recesses 8 provided for this purpose, the respective extension section 11 of which extends in exactly one direction beyond the outer lateral surface 9 of the slip ring 7.

The cross section of the extension section 11 is rectangular, whereby an L-shaped cross section results for both slip rings 7.

Within the slip ring carrier 6, the two slip rings 7 are arranged such that the two extension sections 11 each extending in exactly one axial direction are facing away from one another. As a result, the two slip rings 7 are at a minimum distance 16 from one another, so that they do not negatively influence one another in their heat dissipation and are electrically insulated from one another.

The two slip rings 7 extend exclusively within the recess 8 beyond the respective outer lateral surface 9, which results in a smaller distance between the respective extension section 11 and the coolant-conducting region 17 and thus in more efficient heat dissipation.

Figure 3:
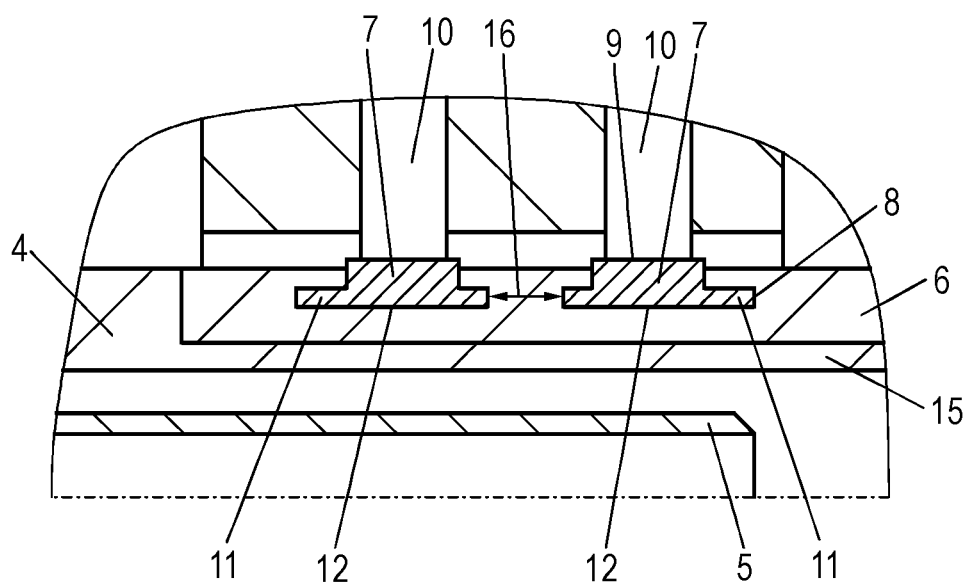
FIG. 3 shows a detail view of a third exemplary embodiment of the electric machine according to the invention.

FIG. 3 shows a detail view of a further exemplary embodiment of the electric machine 1 according to the invention. The respective extension section 11 of the respective slip ring 7 extends here in both axial directions beyond the respective outer lateral surface 9 of the slip ring 7 and is rectangular in cross section, whereby the slip rings 7 have a T-shaped cross section. The axially adjacent slip rings 7 are arranged such that the minimum distance 16 is maintained between the extension sections 11. As a result, the two slip rings 7 thus do not negatively influence one another in their heat dissipation and are electrically insulated from one another. If the extension section 11 extends further beyond the lateral surface 9 of the respective slip ring 7 on one side, those sides on which the extension section 11 respectively extends further beyond the outer lateral surface 9 are facing away from one another.

The two slip rings 7 extend exclusively within the slip ring carrier 6 beyond the respective outer lateral surface 9 in this exemplary embodiment as well, whereby the heat dissipation is more efficient due to the shorter distance between the extension section 11 and the coolant-conducting region 17.

The invention claimed is:

1. An electric machine, comprising:
   a stator and a rotor shaft having a cooling device, the rotor shaft carrying at least one slip ring which has a lateral surface, the lateral surface electrically contacting a contact element fixed on the stator, and the lateral surface is at least partially accommodated in a recess of the rotor shaft,
   wherein an extension section of the slip ring, which is at least partially accommodated in the recess, extends beyond the lateral surface in one or both axial directions of the rotor shaft,
   wherein the cooling device comprises at least one coolant-conducting region which extends through the rotor shaft and thereby overlaps axially with the at least one slip ring.

2. The electric machine as claimed in claim 1, wherein the extension section of the slip ring is rectangular in cross section.

3. The electric machine as claimed in claim 2, wherein the slip ring has a trapezoidal cross section, wherein the shorter of the parallel sides of the trapezoid forms the lateral surface of the slip ring.

4. The electric machine as claimed in claim 2, wherein the slip ring extends beyond the lateral surface exclusively inside the recess.

5. The electric machine as claimed in claim 2, wherein the contact element is separated from the at least one coolant-conducting region at least by a wall forming the recess.

6. The electric machine as claimed in claim 1, wherein the slip ring has an L-shaped cross section.

7. The electric machine as claimed in claim 6, wherein the slip ring extends beyond the lateral surface exclusively inside the recess.

8. The electric machine as claimed in claim 6, wherein the contact element is separated from the at least one coolant-conducting region at least by a wall forming the recess.

9. The electric machine as claimed in claim 1, wherein the slip ring has a trapezoidal cross section, wherein the shorter of the parallel sides of the trapezoid forms the lateral surface of the slip ring.

10. The electric machine as claimed in claim 9, wherein the slip ring extends beyond the lateral surface exclusively inside the recess.

11. The electric machine as claimed in claim 1, wherein the slip ring extends beyond the lateral surface exclusively inside the recess.

12. The electric machine as claimed in claim 1, wherein the contact element is separated from the at least one coolant-conducting region at least by a wall forming the recess.

13. The electric machine as claimed in claim 1, wherein the rotor shaft carries exactly two slip rings spaced apart axially,
   wherein the extension section of each slip ring extends on at least one side in the axial direction beyond the lateral surface in each of the slip rings, and
   wherein the two slip rings are arranged such that the sides on which the extension section respectively extends farther beyond the lateral surface, face away from one another.

14. The electric machine as claimed in claim 13, wherein the rotor shaft is hollow and the cooling device comprises a cylindrical cooling lance positioned within the rotor shaft, wherein a coolant is discharged from the cylindrical cooling lance to flow through at least the at least one coolant-conducting region of the rotor shaft.

15. The electric machine as claimed in claim 14, wherein the coolant proceeds from the at least one coolant-conducting region to flow between the cylindrical cooling lance and an outer housing of the rotor shaft.

16. The electric machine as claimed in claim 1, wherein the slip ring has a T-shaped cross section.

17. The electric machine as claimed in claim 16, wherein the slip ring extends beyond the lateral surface exclusively inside the recess.

18. The electric machine as claimed in claim 1, wherein the rotor shaft is hollow and the cooling device comprises a cylindrical cooling lance positioned within the rotor shaft, wherein a coolant is discharged from the cylindrical cooling lance to flow through at least the at least one coolant-conducting region of the rotor shaft.

19. The electric machine as claimed in claim 18, wherein the coolant proceeds from the at least one coolant-conducting region to flow between the cylindrical cooling lance and an outer housing of the rotor shaft.

20. The electric machine as claimed in claim 1, wherein the cooling device is a heat pipe or thermosiphon.

\* \* \* \* \*